(12) United States Patent
Nasu et al.

(10) Patent No.: US 8,360,401 B2
(45) Date of Patent: Jan. 29, 2013

(54) STORAGE CONTAINER, METHOD FOR MOLDING RESIN, AND METHOD FOR FORMING PLATING FILM

(75) Inventors: Takaki Nasu, Kawasaki (JP); Atsushi Yusa, Ibaraki (JP); Yoshiyuki Nomura, Ibaraki (JP); Masato Fukumori, Kawasaki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 13/408,881

(22) Filed: Feb. 29, 2012

(65) Prior Publication Data

US 2012/0201968 A1     Aug. 9, 2012

Related U.S. Application Data

(62) Division of application No. 13/067,624, filed on Jun. 15, 2011, now Pat. No. 8,147,737, which is a division of application No. 11/806,403, filed on May 31, 2007, now abandoned.

(30) Foreign Application Priority Data

Jun. 2, 2006   (JP) .................. 2006-155355

(51) Int. Cl.
  *B28B 5/00*   (2006.01)
  *B29C 47/80*   (2006.01)
  *B01F 13/08*   (2006.01)
  *B01F 17/00*   (2006.01)
  *C10J 1/00*   (2006.01)

(52) U.S. Cl. ........ 261/72.1; 261/75; 427/304; 425/72.1; 366/347; 366/273; 264/82; 264/328.17

(58) Field of Classification Search ............. 261/72.1, 261/75, DIG. 7; 425/72.1; 427/304; 366/273, 366/347; 264/82, 328.7
See application file for complete search history.

(56) References Cited

U.S. PATENT DOCUMENTS

| | | | | |
|---|---|---|---|---|
| 2,078,843 A | * | 4/1937 | Frolois | 261/75 |
| 2,412,434 A | * | 12/1946 | Thompson | 62/45.1 |
| 2,518,758 A | * | 8/1950 | Cook | 366/274 |
| 2,556,854 A | * | 6/1951 | Spears et al. | 310/104 |
| 2,892,620 A | | 6/1959 | Johnston | |
| 3,119,238 A | * | 1/1964 | Chamberlain et al. | 62/51.1 |
| 3,295,545 A | | 1/1967 | Papell et al. | |
| 3,306,829 A | * | 2/1967 | Patterson et al. | 202/175 |
| 3,433,465 A | * | 3/1969 | Szpur | 366/149 |
| 3,633,878 A | * | 1/1972 | Mendius, Jr. | 366/114 |
| T911002 I4 | * | 6/1973 | Henry | 366/273 |
| 3,764,009 A | | 10/1973 | Watt | |

(Continued)

FOREIGN PATENT DOCUMENTS

JP    U 3012260    4/1995
JP    A 11257593    9/1999

(Continued)

OTHER PUBLICATIONS

Notice of Reasons for Rejection for Japanese Patent Application No. 2006-155355 mailed Jul. 5, 2011 (with Translation).

(Continued)

*Primary Examiner* — Tony G Soohoo
(74) *Attorney, Agent, or Firm* — Oliff & Berridge, PLC

(57) ABSTRACT

A storage container is provided, which includes carbon dioxide containing a functional material and a container body in which carbon dioxide has been hermetically contained. Accordingly, a method for molding a resin, a method for forming a plating film, and the storage container for carbon dioxide, which are excellent in the mass productively at low cost, are provided without using any special high pressure apparatus for producing a supercritical fluid.

12 Claims, 8 Drawing Sheets

U.S. PATENT DOCUMENTS

| | | | |
|---|---|---|---|
| 4,050,607 A * | 9/1977 | Smith | 220/560.09 |
| 4,451,342 A | 5/1984 | Lichtin et al. | |
| 4,462,214 A * | 7/1984 | Ito | 62/51.1 |
| 4,521,541 A | 6/1985 | Rutherford et al. | |
| 4,649,118 A * | 3/1987 | Anderson | 435/297.3 |
| 4,897,226 A * | 1/1990 | Hoyle et al. | 261/129 |
| 5,750,440 A * | 5/1998 | Vanell et al. | 438/692 |
| 5,853,128 A | 12/1998 | Bowen et al. | |
| 5,965,025 A | 10/1999 | Wai et al. | |
| 6,073,292 A | 6/2000 | Lindqvist et al. | |
| 6,247,340 B1 | 6/2001 | Lindqvist et al. | |
| 6,328,916 B1 | 12/2001 | Nishikawa et al. | |
| 6,793,793 B2 | 9/2004 | Yoshida et al. | |
| 6,849,667 B2 | 2/2005 | Haseyama et al. | |
| 6,955,781 B2 * | 10/2005 | Yusa et al. | 264/162 |
| 8,147,737 B2 * | 4/2012 | Nasu et al. | 264/82 |
| 2003/0030706 A1 | 2/2003 | Jagannathan et al. | |
| 2003/0054957 A1 | 3/2003 | Irvin et al. | |
| 2003/0121447 A1 | 7/2003 | Irvin et al. | |
| 2003/0122106 A1 | 7/2003 | Irvin et al. | |
| 2003/0228485 A1 | 12/2003 | Yusa et al. | |
| 2004/0135847 A1 | 7/2004 | Miura | |
| 2005/0175849 A1 | 8/2005 | Yusa et al. | |
| 2005/0205492 A1 | 9/2005 | Yusa et al. | |
| 2005/0240004 A1 | 10/2005 | Yusa et al. | |
| 2006/0219737 A1 | 10/2006 | Larkin | |
| 2007/0108663 A1 * | 5/2007 | Yusa et al. | 264/328.1 |
| 2007/0166530 A1 | 7/2007 | Yusa et al. | |
| 2007/0175763 A1 | 8/2007 | Nagai et al. | |
| 2008/0004194 A1 | 1/2008 | McDermott et al. | |
| 2008/0038453 A1 * | 2/2008 | Yusa et al. | 427/155 |
| 2008/0211118 A1 * | 9/2008 | Wyse et al. | 261/75 |
| 2010/0025880 A1 * | 2/2010 | Ano et al. | 264/129 |
| 2012/0097255 A1 * | 4/2012 | Reed et al. | 137/2 |

FOREIGN PATENT DOCUMENTS

| | | |
|---|---|---|
| JP | A 2001-150504 | 6/2001 |
| JP | A 2001-226874 | 8/2001 |
| JP | A 2002-129464 | 5/2002 |
| JP | A 2002-525186 | 8/2002 |
| JP | A 2002-264164 | 9/2002 |
| JP | A 2002-307530 | 10/2002 |
| JP | A 2002-313750 | 10/2002 |
| JP | A 2003-154644 | 5/2003 |
| JP | A 2004-131658 | 4/2004 |
| JP | A 2004-181448 | 7/2004 |
| JP | A 2004-330720 | 11/2004 |
| JP | A 2005-205898 | 8/2005 |
| JP | B1 3696878 | 9/2005 |
| JP | A 2005-280362 | 10/2005 |
| JP | A 2005-305945 | 11/2005 |
| WO | WO 2005/012140 | 2/2005 |
| WO | WO 2005/078161 | 8/2005 |

OTHER PUBLICATIONS

Notice of Reasons for Rejection for Japanese Patent Application No. 2006-155355 mailed Sep. 27, 2011 (with Translation).

T. Hori, "Latent Application Technique for Supercritical Fluid," NTS Inc., (2004) pp. 250-255.

Nov. 30, 2011 U.S. Office Action issued in corresponding U.S. Appl. No. 13/067,624.

* cited by examiner

STORAGE CONTAINER, METHOD FOR MOLDING RESIN, AND METHOD FOR FORMING PLATING FILM

This is a Divisional of application Ser. No. 13/067,624 filed Jun. 15, 2011, now U.S. Pat. No. 8,147,737 which in turn is a Divisional of application Ser. No. 11/806,403 filed May 31, 2007, now abandoned. The disclosure of the prior applications are hereby incorporated by reference herein in their entirety.

BACKGROUND

The present invention relates to a storage container filled with carbon dioxide containing a functional material (modifying material), and a method for molding a resin and a method for forming a plating film, by using carbon dioxide containing the functional material.

The electroless plating method has been hitherto widely used as a method for forming a metal conductive film on a surface of an electronic device comprised of a plastic structural member. The electroless plating process for the plastic somewhat varies depending on, for example, the material of the plastic. However, in general, the respective steps of resin molding, degreasing of a molded article, etching, neutralization and wetting, addition of catalysts, activation of catalysts, and electroless plating are performed in this order.

For example, a chromic acid solution or an alkali metal hydroxide solution is used as the etching solution in the etching step of the electroless plating process described above, and results in the factor to increase the cost, because the etching solution as described above requires any after-treatment such as the neutralization. Further, a highly toxic etchant is used in the etching step of the electroless plating process described above. Therefore, a problem arises in relation to the handling in view of the environment. In Europe, the instruction of RoHS (Restriction of the use of certain Hazardous Substances in electrical and electric equipment) has been established, which restricts specified harmful chemical substances contained in electric and electronic products. Materials and parts supply manufacturers are required to guarantee the fact that hexavalent chromium or the like is not contained in new electric and electronic devices to be introduced into the European market after Jul. 1, 2006. In view of the circumstances as described above, the conventional electroless plating process for the plastic, which involves the large environmental load, is confronted with the essential task to make the transfer to any substitutive technique.

In order to dissolve the problem involved in the conventional technique for forming the electroless plating film for the plastic, for example, a novel plastic electroless plating method, which is based on the use of the supercritical fluid, is proposed in "Latest Application Technique for Supercritical Fluid" (written by Teruo HORT, NTS Publication, pp. 250-255 (2004)). According to the method described in "Latest Application Technique for Supercritical Fluid", the metal complex can be injected into the polymer surface by dissolving the organic metal complex in carbon dioxide in the supercritical state (hereinafter referred to as "supercritical carbon dioxide" as well) to bring into contact with various types of polymers. Metallic fine particles are deposited on the polymer surface by performing the reducing treatment such as the chemical reducing treatment or the heating for the polymer into which the metal complex is injected. Accordingly, the entire polymer surface can be subjected to the electroless plating. According to this process, it is seen that the electroless plating process for the plastic having the good surface roughness can be achieved, in which it is unnecessary to perform any treatment for the waste liquid.

The present inventors have suggested, for example, in Japanese Patent No. 3696878, a method for producing a molded article in which a functional material such as a metal complex is dissolved beforehand in supercritical carbon dioxide, and the functional material is impregnated into the surface of the molded article during the injection molding by applying the principle described in "Latest Application Technique for Supercritical Fluid". In this method, the functional material is impregnated into the melted resin by bringing the supercritical carbon dioxide, in which the functional material has been dissolved, into contact with the melted resin. After that, the injection molding is performed to produce the molded article.

A foam molding process is suggested as an injection molding process industrially practiced by utilizing the supercritical fluid, for example, in Japanese Patent Application Laid-open No. 2001-150504. In the molding method disclosed in Japanese Patent Application Laid-open No. 2001-150504, an inert gas such as $N_2$ or carbon dioxide is used as a foaming agent without using any conventional chemical foaming agent. The inert gas in the supercritical state is kneaded with a melted resin. The kneading is performed while mixing a resin material to be plasticized and melted and a supercritical fluid such as $N_2$ or $CO_2$ in a screw when the resin material is plasticized and weighed by using the screw.

Various methods have been also hitherto suggested as techniques for modifying the polymer by utilizing the supercritical fluid in order to provide the highly advanced function such as, for example, the improvement in the wettability of the surface of the polymer base material. For example, Japanese Patent Application Laid-open No. 2001-226874 discloses the method for forming the hydrophilic fiber surface by bringing dissolving a supercritical fluid, in which polyalkyl glycol has been dissolved, into contact with the fiber. Japanese Patent Application Laid-open No. 2002-129464 discloses a batch process to realize the highly advanced function of a surface of a polymer base material. Specifically, the supercritical fluid, in which the solute as the functional material has been previously dissolved, is brought into contact with the polymer base material in a supercritical state, i.e., at a high pressure to perform the dyeing.

Japanese Patent Application Laid-open No. 2002-313750 also discloses the following method. At first, a mask, in which holes having desired shapes are formed, is provided on a substrate. Then, a supercritical fluid, in which a substance (metal complex) to be adhered onto the substrate has been dissolved, is jetted onto the mask to form a pattern of not more than 100 μm of the adhered substance on the substrate.

Further, for example, a method is also suggested in Japanese Patent Application Laid-open No. 2005-305945, in which a plating catalyst core (metal complex) is impregnated into a part of surface of a polymer base material by using a technique for modifying the surface of the polymer base material based on the use of a supercritical fluid, and then, a plating film is formed on the polymer base material. In Japanese Patent Application Laid-open No. 2005-305945, the following method is suggested as a method for selectively impregnating the metal complex into the part of the surface of the polymer base material. At first, the metal complex is added to a wide area or the entire area of the surface of the polymer base material. Subsequently, a mold surface, which has a predetermined concave/convex pattern, is brought into tight contact with or adhesion to the surface of the polymer base material. Subsequently, the supercritical fluid is allowed to flow into the space defined by the mold (concave portion or recess) and the surface of the polymer base material. The metal complex is selectively impregnated into only the surface area of the polymer base material into which the supercritical fluid is allowed to flow.

The method, which is disclosed in "Latest Application Technique for Supercritical Fluid" described above, is the batch process. Therefore, this method can be industrially practiced when a large amount of fiber, sheet or the like can be processed in a high pressure vessel. However, in this principle, the polymer surface is softened by the supercritical carbon dioxide or the like, and the supercritical fluid and the metal complex as the modifying material (functional material) are impregnated into the polymer. Therefore, when a large-sized injection molding article or plastic is produced, the method is difficult to be industrially practiced, because it is difficult to maintain the shape of the polymer by softening thereof. Further, the high pressure vessel and the apparatus for generating the supercritical carbon dioxide are the factors to increase the cost.

Nitrogen or carbon dioxide in the supercritical state is also brought into contact with the resin in the melted state or the solidified state in the techniques disclosed in Japanese Patent No. 3696878 and Japanese Patent Application Laid-open Nos. 2001-150504, 2001-226874, 2002-129464, 2002-313750, and 2005-345945 described above. The apparatus for generating the supercritical fluid is the factor to increase the cost in the same manner as in the technique disclosed in "Latest Application Technique for Supercritical Fluid" described above.

More specifically, in the case of the conventional technique as described above, when carbon dioxide is used as the medium for dissolving the functional material, it is necessary that the pressure is previously raised to not less than 7.38 MPa, and the temperature is raised to not less than 31° C. to provide the supercritical state. Therefore, the task resides in the long term reliability of the seal of the piping and the apparatus for generating the supercritical fluid. Further, it is necessary to provide a step of pressurizing carbon dioxide and an expensive high pressure pump and/or a high pressure dissolution tank for dissolving the solute (functional material). These matters bring about the factor to increase the cost when the molded article is mass-produced.

SUMMARY

The present invention has been made in order to solve the problems as described above. An object of the present invention is to provide a method for molding a resin in which a functional material is impregnated into the surface and/or the interior of a molded article without using any special high pressure apparatus for producing the supercritical fluid as the factor to increase the cost as described above, a method for forming a plating film on the surface of the resin, and a storage container for carbon dioxide to be used for the foregoing methods so that a method for forming a resin, a method for forming a plating film, and a supply source of carbon dioxide, which involve the low cost and which are excellent in the mass productivity, are provided.

According to a first aspect of the present invention, there is provided a storage container comprising:
  carbon dioxide which contains a functional material; and
  a container body in which the carbon dioxide has been hermetically contained (the container body is gas-sealed).

The state of carbon dioxide to be charged into the storage container of the present invention may be either the supercritical state or a state in which the temperature is lower than and/or the pressure is lower than those of the critical point of the supercritical state (31° C., 7.38 MPa), i.e., a state in which carbon dioxide gas and liquid carbon dioxide coexist (hereinafter referred to as "gas-liquid coexisting state", "gas-liquid intermixed state", or "gas-liquid mixed state" as well).

As a result of diligent investigations performed by the present inventors in relation to the method for molding the resin based on the use of the supercritical carbon dioxide, the following fact has been revealed. That is, some functional materials, which are soluble in the supercritical carbon dioxide or the high pressure (pressurized) carbon dioxide gas, are also soluble in the low pressure carbon dioxide in a liquid state. The some functional material can be preserved (stored) in such a state that the functional material (modifying material) is dissolved in the liquid carbon dioxide which is filled in the transportable high pressure container (storage container) such as a high pressure bomb.

The present inventors have found out the following fact. That is, even when the resin in the melted state is allowed to be in a reduced pressure atmosphere, and then the carbon dioxide in the liquid state, which does not arrive at the supercritical condition, is introduced or injected into the melted resin, the liquid can be introduced or injected into the melted resin in a high pressure cylinder such as a molding machine. Further, the present inventors have found out the following fact. That is, in this situation, the introduced liquid carbon dioxide instantaneously undergoes the volume expansion due to the contact with the high temperature resin in the high pressure cylinder or the like to provide the supercritical state. Carbon dioxide and the functional material dissolved therein are easily impregnated into the melted resin.

Therefore, when the resin is molded by using the storage container of the present invention, the functional material can be impregnated into the resin merely by bringing the melted resin into contact with carbon dioxide in which the functional material has been dissolved. Therefore, when the resin is molded by using the storage container of the present invention, it is unnecessary to separately prepare any special high pressure apparatus for producing the supercritical fluid unlike the conventional technique. Therefore, it is possible to provide the method for molding the resin and the method for forming the plating film in which the cost is lower and the mass-productivity is excellent. Further, the storage container of the present invention is preferably usable as a inexpensive supply source of the functional material and carbon dioxide.

Any arbitrary functional material may be dissolved in carbon dioxide in the storage container of the present invention. Specifically, it may be used, for example, various dyes, polyalkyl glycol, fluorine compounds, low molecular weight polymers, and low molecular weight monomers.

In the storage container of the present invention, the functional material may be a hydrophilic material such as polyalkyl glycol, or a hydrophobic material such as silicone oil and fluorine-based materials. For example, the wettability of the resin surface can be improved by introducing a polymer or a monomer having an amide group or a hydroxyl group including, for example, polyalkyl glycol, acrylamide, and ε-caprolactam. The water-shedding quality can be added to the resin surface by using, for example, fluorine-based compounds or silicone oil.

In the storage container of the present invention, the functional material may be metallic fine particles of the metal complex or the precursor of metal oxide. When the metallic fine particles are used, the metallic fine particles, which serve as the catalyst core for the electroless plating, can be impregnated into the surface of the polymer base material. The conductivity and the thermal conductivity can be added to the polymer base material by using the metallic fine particles of, for example, the metal complex or the metal alkoxide to impregnate the metallic fine particles into the surface of the polymer base material.

In the storage container of the present invention, the functional material may be inorganic fine particles. When the inorganic fine particles of, for example, $SiO_2$, $Al_2O_3$, $Cr_2O_3$, or $TiO_2$ are used as the functional material, it is possible to suppress the coefficient of thermal expansion of the polymer base material. When the inorganic fine particles of, for example, $SiO_2$ are used as the functional material, it is possible to control the refractive index of the polymer base material. When the inorganic substance as described above is used as the functional material, it is desirable that the precursor of the raw material is used, or any chemical or physical modification is applied to the inorganic substance so that the inorganic substance is soluble in the liquid carbon dioxide.

In the storage container of the present invention, the functional material may be a surfactant. When the surfactant is used as the functional material, the effect is expected to improve the wettability of the polymer base material and the prevention of the electrification.

The material, which is usable as the functional material other than the materials described above, includes, for example, ultraviolet stabilizers such as benzophenone and coumarin, aromatic agents, monomers of various polymers such as methyl methacrylate and polymerization initiating materials, and chemicals.

In the present invention, the pressure is arbitrary in the storage container for the liquid carbon dioxide. However, in order to sufficiently maintain the solubility of the functional material, the storage container may be used at least not less than 3 MPa, and more desirably not less than 5 MPa. In view of the safety and the quality control of the storage container, the pressure of carbon dioxide in the storage container may be not more than 15 MPa, and more desirably not more than 7.38 MPa at which carbon dioxide is in the supercritical state.

According to the laws and ordinances in Japan, it is specified that the filling constant C of the storage container, which is represented by $C=V/G$ (G: mass of liquefied gas, V: container internal volume of the bomb), is not more than 1.34. FIG. 6 shows the relationship between the temperature and the pressure in the storage container when carbon dioxide is filled or charged in accordance with the provision of the laws and ordinances. When the temperature is 14° C., then a state is given, in which the liquid is 90% and the gas coexists in the upper layer in the storage container, and the pressure is 4.9 MPa. When the temperature is 22° C., then the entire content of the container is the liquid, and the pressure is 5.9 MPa. When the temperature exceeds the critical temperature (31° C.), then the entire content of the container is the gas or the supercritical state. It is prescribed that the safety plate bursts when the temperature is further raised to arrive at a state having the pressure of 15.7 MP.

The method is arbitrary to collect and supply carbon dioxide in which the functional material has been dissolved, from the storage container filled with carbon dioxide according to the present invention. Specifically, for example, when carbon dioxide is in the gas-liquid coexisting state (state which does not arrive at the critical point of the supercritical state), it is possible to collect and use only the liquid carbon dioxide, in which the functional material has been dissolved, with a siphon tube. The reason thereof will be explained below.

FIGS. 7 and 8 show results of the measurement of the pressure change in the bomb when carbon dioxide is taken out continuously at a constant flow rate by using the conventional liquid carbon dioxide bomb filled with 30 kg. FIG. 7 shows the characteristic obtained when the bomb, which is not provided with the siphon tube, is used. FIG. 8 shows the characteristic obtained when the bomb, which is provided with the siphon tube, is used. The measurement temperature condition was about 14° C. as a winter environment. The pressure, which is obtained when the bomb is fully filled, is about 5 MPa at this temperature. As a result diligent investigations performed by the present inventors, in the case of the bomb which is not provided with the siphon tube, as shown in FIG. 7, the pressure in the container is suddenly lowered in accordance with the progress of the use of carbon dioxide (elapsed time depicted on the horizontal axis in FIG. 7), and it is impossible to maintain any constant pressure in the container. On the other hand, in the case of the bomb which is provided with the siphon tube, it is possible to selectively collect the liquid phase existing in the lower layer in the bomb. Therefore, the following fact has been revealed. That is, when the flow rate is sufficiently small (for example, 10 [1/min]), as shown in FIG. 8, the pressure in the container is not suddenly lowered in accordance with the progress of the use of carbon dioxide (elapsed time depicted on the horizontal axis in FIG. 8), and it is possible to stably maintain the pressure.

In the case of the storage container of the present invention, it is desirable that the temperature of the storage container is not more than 31° C. as the critical point of the supercritical state of carbon dioxide. More favorably, it is desirable that the temperature is not more than 22° C. at which the interior of the storage container, which satisfies the provision of the filling constant C of the bomb, is in the gas-liquid coexisting state. In this situation, the liquid carbon dioxide, in which the functional material has been dissolved, can be supplied from the storage container at a stable pressure of not more than about 5.9 MPa. In this case, when the amount of use of the liquid carbon dioxide is increased, then the liquid level of the liquid surface is lowered, and the amount of the gas is increased corresponding thereto. Therefore, when the temperature of the storage container is not more than 22° C., the carbon dioxide, in which the functional material has been dissolved, can be always supplied stably at a constant pressure in the liquid state, which is preferred.

As shown in FIG. 8, when the flow rate of the liquid carbon dioxide is smaller, the liquid carbon dioxide can be supplied at a stable pressure. Therefore, when it is intended to increase the flow rate of the liquid carbon dioxide to be supplied, the following method is favorably adopted. That is, the storage containers are connected in parallel, and the liquid carbon dioxide is allowed to outflow simultaneously from the respective storage containers.

As for the method for collecting and supplying carbon dioxide in which the functional material has been dissolved, from the storage container of the present invention, it is also appropriate to adopt a method in which the temperature and the pressure of the storage container are increased, other than the method in which only the liquid phase is taken out from carbon dioxide in the gas-liquid intermixed state as described above. However, in this method, for example, when the carbon dioxide, which is contained in the storage container, is the gas exceeding the critical temperature or in the supercritical state, it is inevitable that the pressure is lowered as the carbon dioxide is consumed. As a result, when the carbon dioxide is consumed, the solubility of the functional material is changed in the high pressure container. Therefore, when this method is used, it is preferable to adopt the following method as a method for stabilizing the solubility of the functional material and the supply pressure of carbon dioxide to be supplied, for example, to the molding machine.

For example, the following procedure is preferred. At first, the temperature is set beforehand so that the internal pressure of the storage container is about 10 to 15 MPa. Then, the internal pressure of the storage container, which is located in the primary or upstream side, is once reduced by using, for example, a pressure-reducing valve. Subsequently, carbon dioxide is supplied to the apparatus such as the molding machine in a state in which the temperature and the pressure of carbon dioxide are constant on the secondary or downstream side of the pressure-reducing valve or the like. In the case of this method, it is desirable that the charge amount of the functional material into the storage container is adjusted so that the solubility of the functional material contained in the storage container is not more than the saturation solubility at the pressure and the temperature of carbon dioxide on the secondary side subjected to the pressure reduction as the supply pressure to the apparatus. The pressure in the storage container during the initial filling, is sufficiently higher than the pressure on the secondary side. Therefore, the functional material, which has been dissolved in the unsaturated state, approaches the saturated state in accordance with the consumption of the carbon dioxide and the functional material in the storage container. As a result, the deposition of the functional material is suppressed as well.

The storage container of the present invention may further comprise a stirring apparatus in order to stabilize the solubility of the functional material in the liquid carbon dioxide. An apparatus may be used as the stirring apparatus, which includes, for example, a stirring bar which is provided in the container body, and a magnetic stirrer which is provided outside the container body in order to drive the stirring bar. In this arrangement, when the container body of the storage container is formed of a nonmagnetic material, the stirring bar, which is contained in the container body, can be rotated by means of the external magnetic stirrer. Accordingly, it is possible to stabilize the solubility of the functional material contained in the liquid carbon dioxide. The nonmagnetic material, which is usable for the container body of the storage container, includes, for example, aluminum, stainless steel, inconel, hastelloy, and titanium. An ultrasonic generator may be provided as the stirring apparatus at the outside of the container body. In this arrangement, it is possible to stabilize the solubility of the functional material contained in the container body by applying the ultrasonic wave to the liquid carbon dioxide contained in the container body.

In the storage container of the present invention, an organic solvent such as alcohol and acetone may be mixed and used as an auxiliary agent in the container body in order to stabilize or improve the solubility of the functional material with respect to carbon dioxide.

According to a second aspect of the present invention, there is provided a method for molding a resin, comprising:

preparing liquid carbon dioxide containing a functional material; and impregnating the functional material into the resin by bringing the liquid carbon dioxide into contact with the resin having a temperature higher than that of the liquid carbon dioxide.

In the molding method of the present invention, a state of the resin may be controlled so that the liquid carbon dioxide is changed into one of carbon dioxide in a supercritical state and high pressure carbon dioxide gas when the liquid carbon dioxide is brought into contact with the resin.

The present inventors have found out, by a verifying experiment, the fact that the functional material is impregnated into the resin even when the liquid carbon dioxide, which has been dissolved with the functional material and which is in the state of low temperature and/or low pressure of not more than the critical point of the supercritical state, is brought into contact with the resin having a temperature higher than that of the liquid carbon dioxide. This phenomenon is considered as follows. That is, even when the liquid carbon dioxide is in the state of low temperature and/or low pressure of not more than the critical point of the supercritical state, the liquid carbon dioxide instantaneously has a high temperature by bringing into contact with the melted resin having the high temperature. When the temperature is raised to be high while maintaining a constant volume, the high pressure state or the supercritical state is given. Then, the liquid carbon dioxide is diffused at a high velocity into the resin. Alternatively, the following consideration may be made. That is, as the pressure is raised, for example, by the holding pressure for the thermoplastic melted resin, the pressure and the diffusibility of carbon dioxide are improved in the same manner as described above. Accordingly, the functional material, which has been dissolved in the liquid carbon dioxide, can be impregnated into the resin in the heated, melted, or semi-melted state.

In the molding method of the present invention, any arbitrary method may be available to impregnate, into the resin, the carbon dioxide in which the functional material has been dissolved. For example, the carbon oxide may be impregnated into a vent-portion of a vent-type screw, i.e., into a physical pressure-reducing mechanism portion in a plasticizing cylinder of an extrusion molding machine or an injection molding machine. In this case, the carbon dioxide and the functional material can be impregnated into the whole or a part of the melted resin while plasticizing the resin.

In the molding method based on the injection molding of the present invention, the method is arbitrary to impregnate the functional material into the flow front portion. However, for example, the following process may be adopted. At first, when the injection molding is performed, the screw is moved backwardly in ordinary cases in accordance with the increase in the internal pressure of the resin disposed in front of the screw by performing the plasticization and the weighing while rotating the screw. In the molding method of the present invention, the screw is moved backwardly without rotating the screw after the weighing to reduce the pressure in the melted resin disposed in front of the screw (on the side of the mold). Subsequently, the liquid carbon dioxide and the functional material, which are at the pressure higher than the internal pressure of the melted resin, are impregnated into the forward end portion (flow front portion) in the melted resin in the state of reduced pressure. The back pressure at the back of the screw is raised, and thus the screw is moved frontwardly again. In accordance with the method as described above, the carbon dioxide, which is at the high temperature and the high pressure, for example, in the supercritical state, can be diffused into the flow front portion of the resin together with the functional material dissolved in the carbon dioxide. When the injection molding is performed (the cavity defined in the mold is filled) after impregnating the functional material into the flow front portion, the functional material, which is disposed at the flow front portion, is diffused to the surface of the molded article due to the fountain effect of the filling resin (skin layer is formed). As a result, it is possible to mold the injection molding article in which the functional material is dispersed in the skin layer (is impregnated into the surface).

In the molding method of the present invention, the method for molding the resin may be a method for molding a thermoplastic resin based on the use of an extrusion molding machine; the method for molding the thermoplastic resin comprising: bringing the liquid carbon dioxide containing the functional material into contact with the thermoplastic resin which is in a melted state or a softened state in the extrusion molding machine so that the functional material is impregnated into the thermoplastic resin; and performing extrusion molding for the thermoplastic resin into which the functional material has been impregnated.

In the molding method of the present invention, the preparation of the liquid carbon dioxide containing the functional material may include preparing a storage container which is filled with the liquid carbon dioxide containing the functional material. In the molding method of the present invention, when the storage container such as the bomb filled with the liquid carbon dioxide dissolved with the functional material, is used as the supply source for the liquid carbon dioxide in which the functional material has been dissolved, the liquid carbon dioxide, in which the solubility of the functional material is stabilized, can be supplied more easily.

The type of the resin capable of being used in the molding method of the present invention is arbitrary. It is possible to use thermoplastic resins, thermosetting resins, and photo-curable resins. Those usable as the thermoplastic resin include, for example, synthetic fiber such as those based on polyester, polypropylene, polymethyl methacrylate, polycarbonate, amorphous polyolefin, polyetherimide, polyethylene terephthalate, liquid crystal polymer, ABS resin, polyamide-imide, biodegradable plastic such as polylactic acid, nylon resin, and composite materials thereof. It is also possible to use resin materials kneaded, for example, with various inorganic fillers including, for example, glass fiber, carbon fiber, and nanocarbon. Those usable as the thermosetting resin include, for example, polyimide, silicone resin, and urethane resin. Those usable as the photo-curable resin include, for example, acrylic resin and epoxy resin. The materials as described above can be appropriately selected depending on the way of use.

According to a third aspect of the present invention, there is provided a method for forming a plating film, comprising:

molding a molded article including metallic fine particles impregnated into a surface of the molded article by using the method for forming the resin according to the second aspect of the present invention; and forming the plating film by an electroless plating method on the surface of the molded article into which the metallic fine particles have been impregnated.

In the molding method of the present invention described above, when the metallic fine particles are used as the functional material, the metallic fine particles can be dispersed in the surface of the molded article (impregnate the metallic fine particles into the surface of the molded article). The metal film can be formed on the surface of the molded article by means of the electroless plating method by using the metallic fine particles as the catalyst core. When the plating method as described above is used, the satisfactory electroless plating film can be also formed on any polymer base material (resin material) on which the surface is hardly roughened by the etching in the case of any conventional method and on which it has been difficult to form any electroless plating film having highly tight contact or adhesion performance.

In the molding method of the present invention described above, when the metallic fine particles are used as the functional material, the metallic fine particles can be dispersed in the surface of the molded article (impregnate the metallic fine particles into the surface of the molded article). The metal film can be formed on the surface of the molded article by means of the electroless plating method by using the metallic fine particles as the catalyst core. When the plating method as described above is used, the satisfactory electroless plating film can be also formed on any polymer base material (resin material) on which the surface is hardly roughened by the etching in the case of any conventional method and on which it has been difficult to form any electroless plating film having highly tight contact or adhesion performance.

According to the storage container of the present invention, it is possible to supply carbon dioxide in which the functional material has been dissolved with the inexpensive apparatus without using any special high pressure apparatus.

According to the molding method of the present invention, the functional material can be impregnated into the resin by using the liquid carbon dioxide at the low pressure and/or the low temperature of not more than the critical point of the supercritical state. Therefore, the molded article, in which the surface and/or the interior is modified with the functional material, can be produced without using any special high pressure apparatus to allow carbon dioxide to be in the high pressure state or the supercritical state. Therefore, the molded article, in which the surface and/or the interior is modified with the functional material, can be easily produced at low cost.

According to the method for forming the plating film of the present invention, the metallic fine particles can be dispersed into the surface of the molded article at the stage of molding of the molded article. The metal film can be formed on the surface of the molded article by the electroless plating method by using the metallic fine particles as the catalyst core. Therefore, the plating film can be easily formed on the surface of the molded article without using any solvent which involves the large environmental load. According to the method for forming the plating film of the present invention, the satisfactory electroless plating film can be also formed on any polymer base material (resin material) on which the surface is hardly roughened by the etching in the case of any conventional method and on which it has been difficult to form any electroless plating film having highly tight contact or adhesion performance.

DETAILED DESCRIPTION OF EMBODIMENTS

Figure 9:
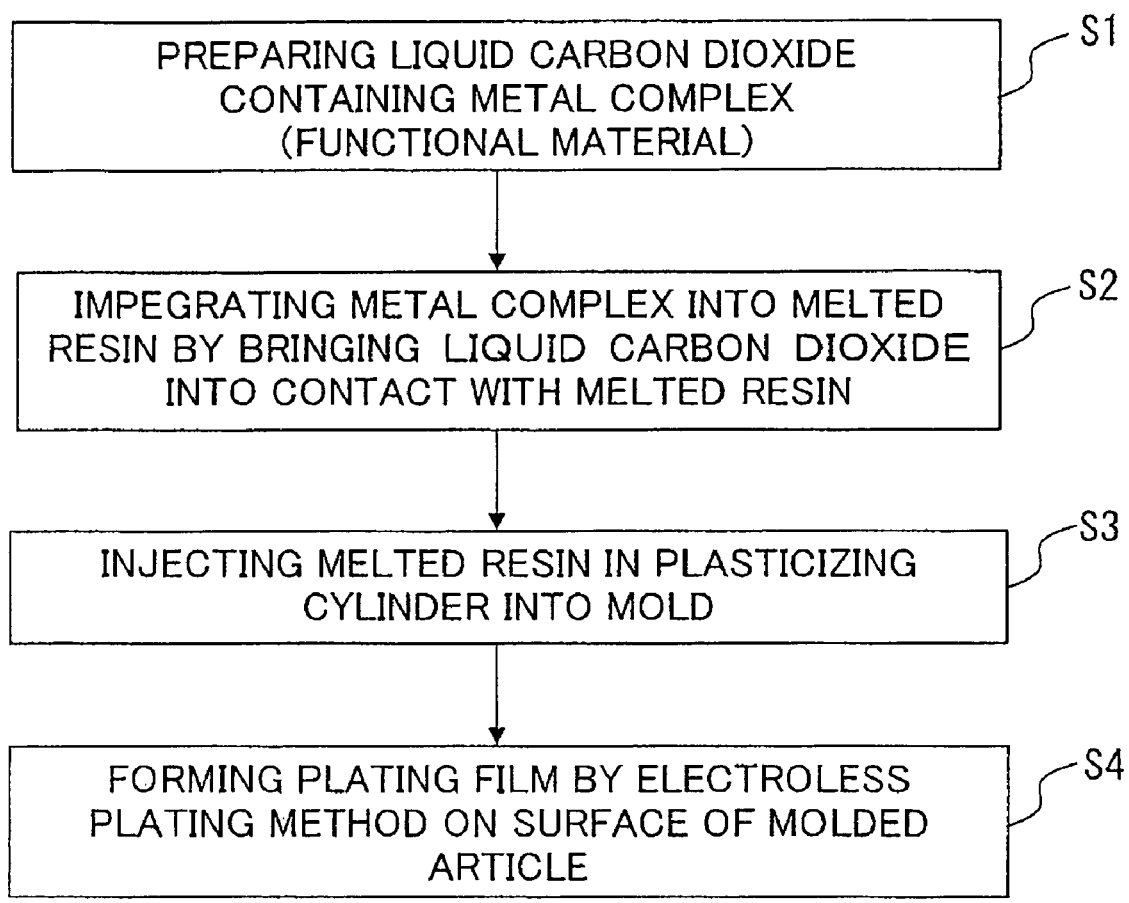
FIG. 9 shows a flow chart for explaining the method for molding the resin and the method for forming a plating film on the molded article in the first embodiment.

FIG. 9 shows a flow chart for explaining the method for molding the resin and the method for forming a plating film on the molded article in the first embodiment.

In a first embodiment, an explanation will be made about a method for molding a resin and a method for forming a plating film using an injection molding machine, and a storage container for supplying, to the injection molding machine, liquid carbon dioxide in which a functional material has dissolved.

The type of the resin capable of being used in the molding method of this embodiment is arbitrary. It is possible to use, for example, thermoplastic resins including, for example, synthetic fiber such as those based on polyester, polypropylene, polymethyl methacrylate, polycarbonate, amorphous polyolefin, polyetherimide, polyethylene terephthalate, liquid crystal polymer, ABS resin, polyamideimide, polylactic acid, nylon resin, and composite materials thereof. It is also possible to use resin materials kneaded, for example, with various inorganic fillers including, for example, glass fiber, carbon fiber, and nanocarbon. The materials as described above can be appropriately selected depending on the way of use. In this embodiment, polycarbonate having a glass transition temperature of 145° C. was used.

Figure 5:
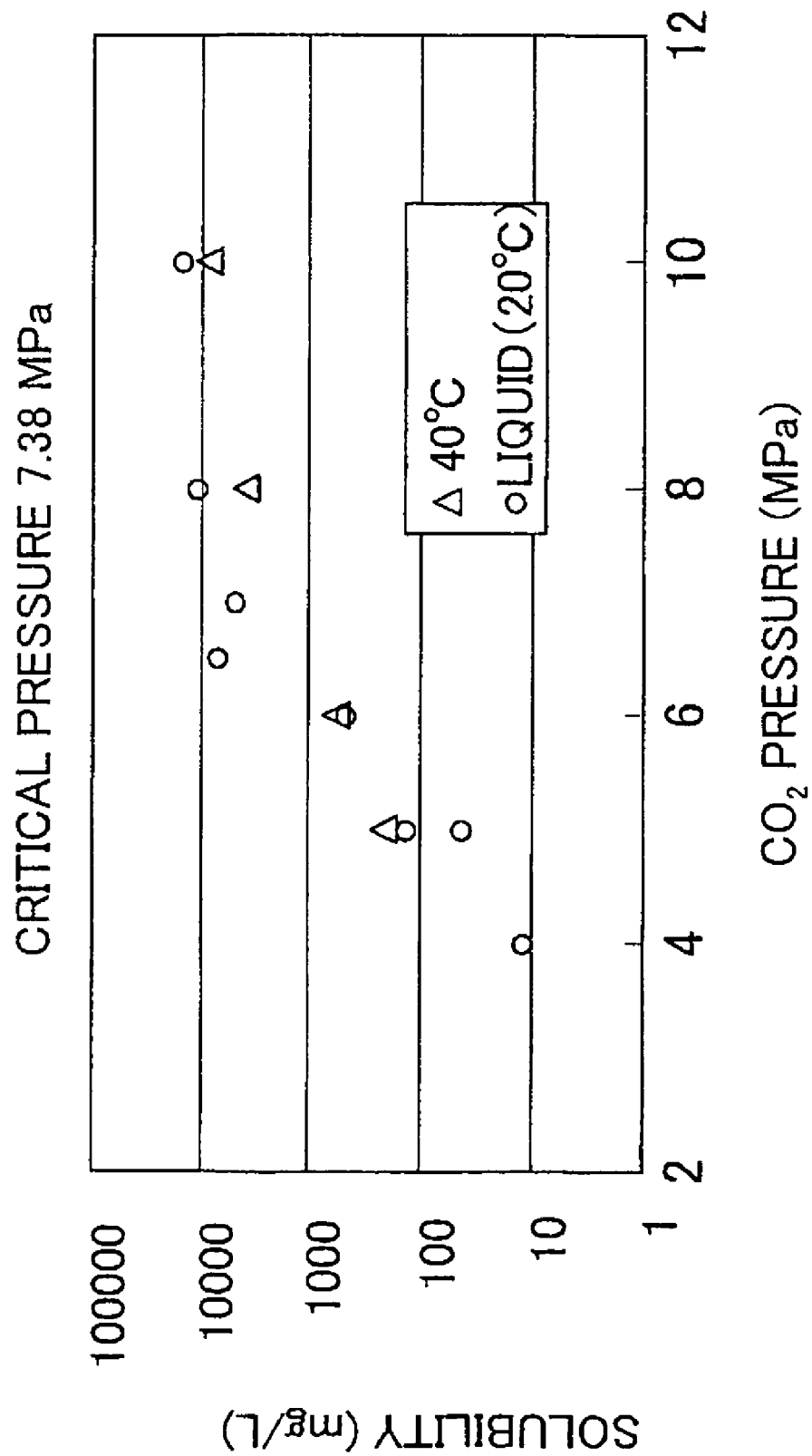
FIG. 5 shows the pressure dependence of the solubility of the functional material used in the embodiments.
Figure 6:
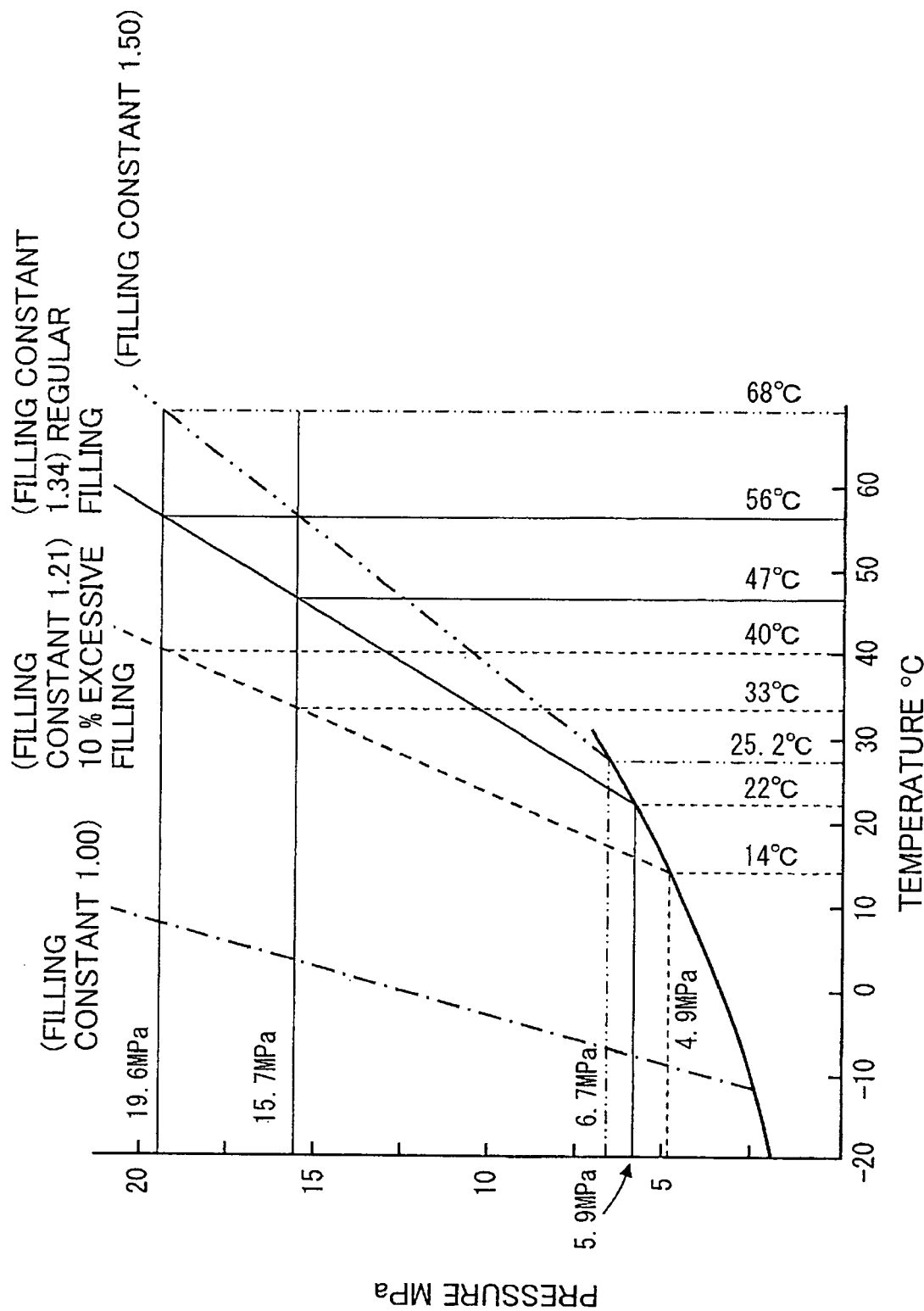
FIG. 6 shows the relationship between the temperature and the pressure of the carbon dioxide bomb.
Figure 7:
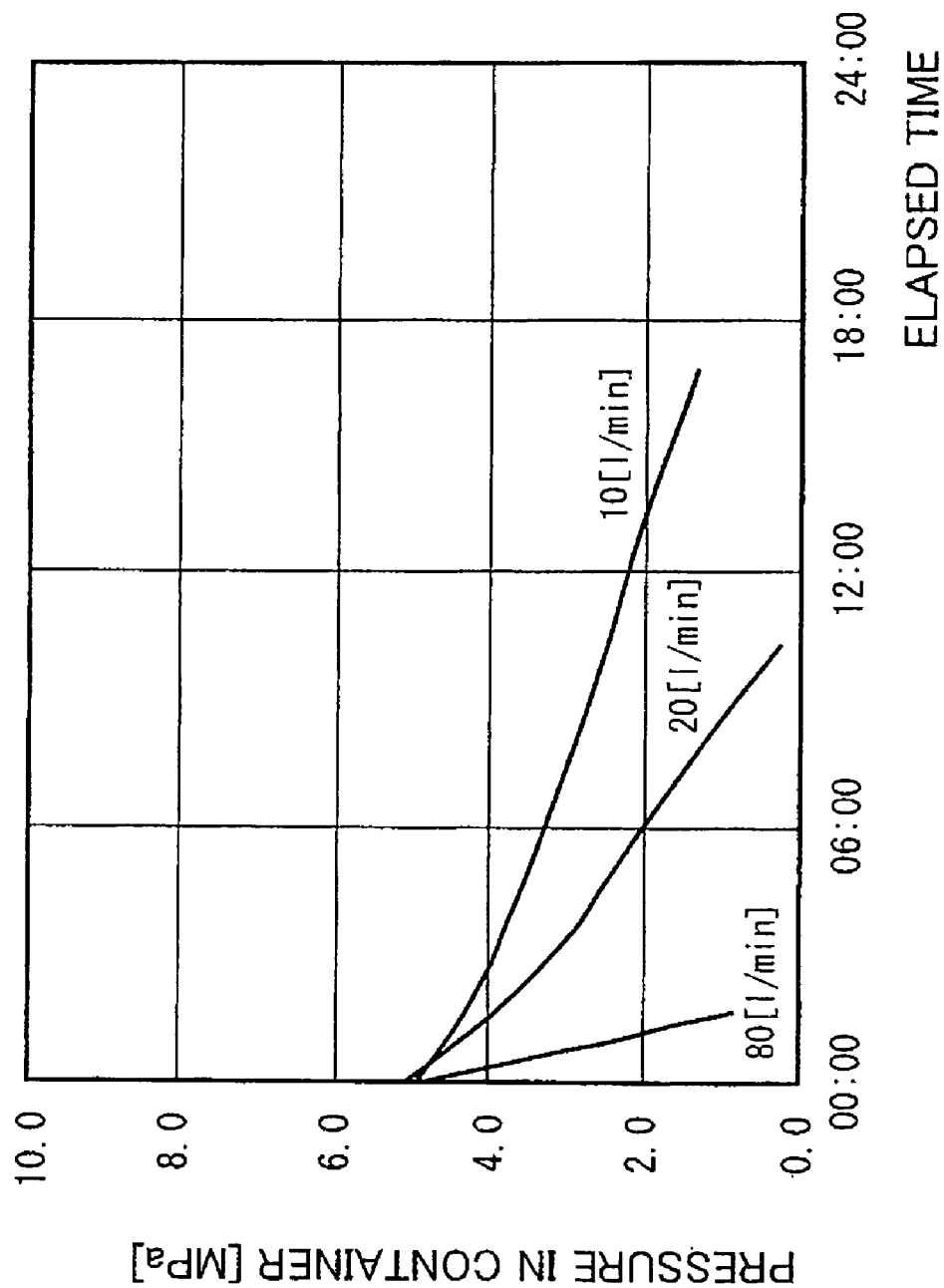
FIG. 7 shows the characteristic of the change of the container internal pressure with respect to the consumption in the carbon dioxide bomb when any siphon tube is not used.
Figure 8:
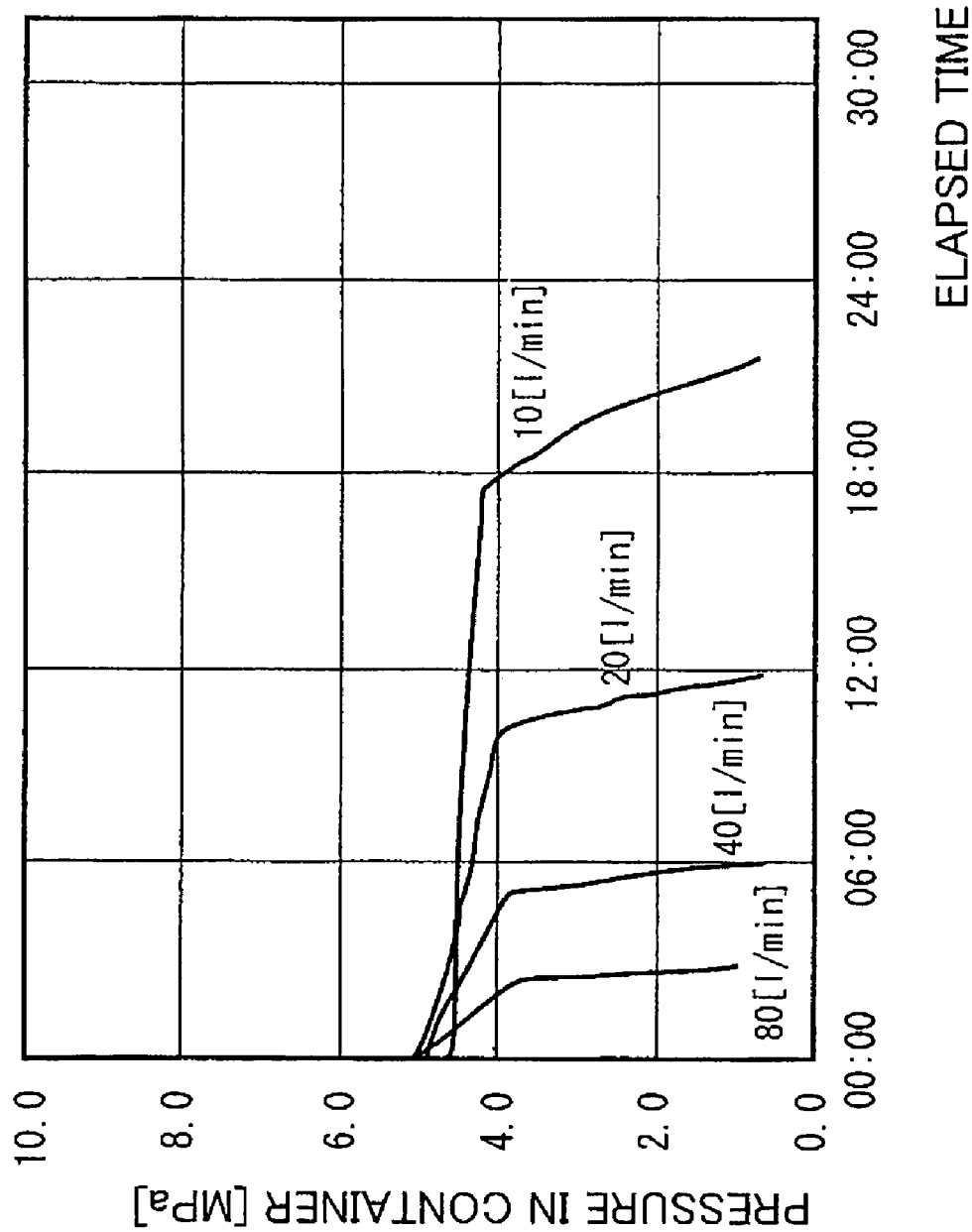
FIG. 8 shows the characteristic of the change of the container internal pressure with respect to the consumption in the carbon dioxide bomb when the siphon tube is used.

In this embodiment, hexafluoroacetylacetonato palladium (II) as the metal complex was used as the functional material to be dissolved in the liquid carbon dioxide. The type of the functional material is arbitrary. It is possible to use, for example, dye or dyestuff, polyalkyl glycol, metallic fine particles of metal complex or the like, and fluorine compound. The selection of the functional material can be appropriately determined, for example, depending on the way of use. FIG. 5 shows the pressure dependence of the solubility of the metal complex (hexafluoroacetylacetonato palladium (II)) used in this embodiment with respect to the liquid carbon dioxide (20° C.). Carbon dioxide is in the supercritical state under the condition in which the temperature is 31° C. and the pressure is not less than 7.38 MPa. FIG. 5 also shows the pressure dependence of the solubility with respect to carbon dioxide at 40° C. (gas state).

The amount of dissolution of the metal complex with respect to carbon dioxide was determined by the extraction method. Specifically, at first, the metal complex is charged or put into a pressure vessel so that the supersaturated state is given. The pressure is raised to a desired constant pressure to dissolve the metal complex in carbon dioxide. After that, the internal pressure of the pressure vessel is constantly retained by a back pressure valve. In this state, a predetermined amount of carbon dioxide is allowed to flow and discharge at a constant flow rate into an alcohol solvent contained in an extraction vessel disposed outside the pressure vessel by using a syringe pump. The mass of the metal complex, which is extracted into the alcohol solvent, is regarded as the dissolution amount, and the amount of carbon dioxide, which is allowed to flow, is regarded as the solvent amount to calculate the solubility of the metal complex.

As clarified from FIG. 5, it has been revealed that the metal complex used in this embodiment exhibits the solubility to some extent even in the gas state at 40° C. and not more than 7 MPa. According to FIG. 5, it is appreciated that the metal complex used in this embodiment has the satisfactory solubility with respect to the liquid carbon dioxide at 20° C. as well. As described above, it is desirable that the material, which also exhibits the solubility to some extent with respect to the low pressure carbon dioxide of not more than the critical point (supercritical state), is used as the functional material to be used in the present invention.

Figure 1:
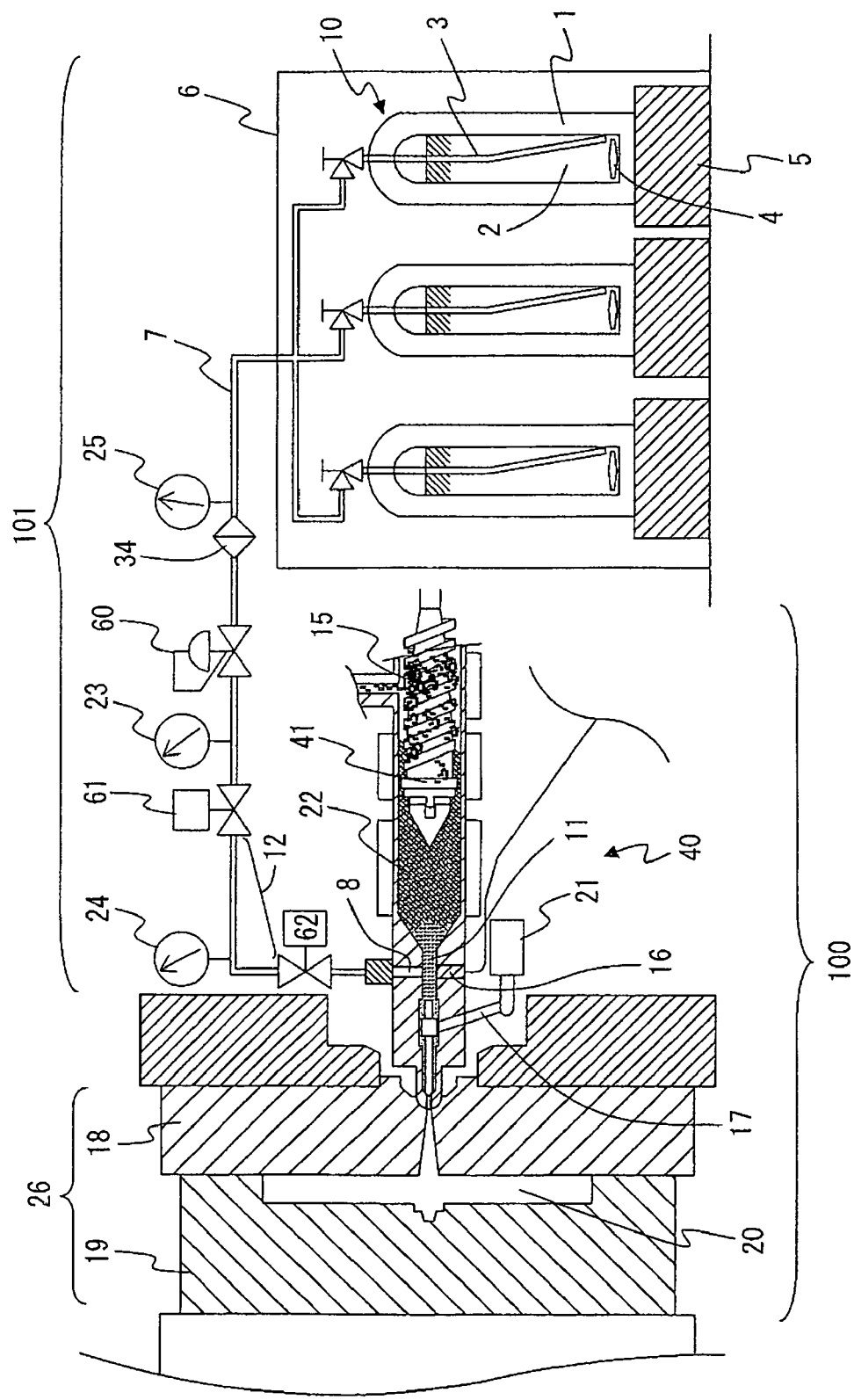
FIG. 1 shows a schematic arrangement illustrating a molding apparatus used in first to third embodiments.

FIG. 1 shows a schematic arrangement of a molding apparatus used in this embodiment. As shown in FIG. 1, the molding apparatus used in this embodiment principally includes an injection molding machine 100 and a carbon dioxide supply unit 101.

As shown in FIG. 1, the injection molding machine 100 principally includes a plasticizing cylinder 40 which injects the melted resin, and a mold 26. The mold 26 is composed of a movable mold 19 and a fixed mold 18. As shown in FIG. 1, the fixed mold 18 knocks to the movable mold 19 in the mold 26 to define a cavity 20 at the interface between the fixed mold 18 and the movable mold 19. The injection molding machine 100 of this embodiment is interconnected to an unillustrated electric toggle mold-claming mechanism. The movable mold 19 is moved in the horizontal direction as viewed in the drawing, and thus the mold 26 is opened/closed. As shown in FIG. 1, an introducing port 8 for liquid carbon dioxide is provided at a side portion of a flow front portion 11 in the plasticizing cylinder 40. The other structure of the injection molding machine 100 is the same as the structure of any conventional injection molding machine.

As shown in FIG. 1, the carbon dioxide supply unit 101 principally includes three storage containers 10, a filter 34, a pressure-reducing valve 60, a first air operate valve 61, a second air operate valve 62, three pressure gauges 23 to 25, and a piping 7 which connects the constitutive components as described above. As shown in FIG. 1, the output side (secondary side) of the second air operate valve 62 is connected via the piping 7 to the introducing port 8 of the injection molding machine 100.

In the present invention, in order to maintain carbon dioxide in the liquid state, it is desirable that the temperature is controlled so that the piping and the valves, through which the liquid carbon dioxide is allowed to flow, have the low temperature. In this embodiment, the entire piping 7, through which carbon dioxide is allowed to flow, was the double piping (not shown). Carbon dioxide was allowed to flow through only the piping disposed on the inner side. Cooling water at 20° C. was allowed to flow by using an unillustrated chiller through the piping disposed on the outer side of the double piping. In this way, in this embodiment, carbon dioxide, which is disposed in the piping and the valves, was always cooled.

In this embodiment, the surrounding of the valve 62 was covered with an unillustrated cooling manifold to cool the manifold and the valve 62 in order to suppress the increase in the temperature of the second air operate valve 62 disposed adjacently to the plasticizing cylinder 40 having the high temperature. Further, in this embodiment, the piping 12, which is disposed between the first air operate valve 61 and the second air operate valve 62, could be instantaneously heated from the outside by means of an unillustrated infrared lamp.

As shown in FIG. 1, the storage container 10 principally includes a container body 1 which is formed of aluminum (nonmagnetic material) and is gas-sealed, liquid carbon dioxide 2 with which the interior of the container body 1 is filled (hermetically contained) and in which the functional material has been dissolved, a siphon tube 3 which is provided to take out the liquid carbon dioxide 2 from the storage container 10, a stirring bar 4 which is provided to retain a constant solubility of the functional material in the liquid carbon dioxide 2, and a magnetic stirrer 5 which is provided to drive and rotate the stirring bar 4. In this embodiment, the carbon dioxide, with which the interior of the container body 1 is filled, is stored in the gas-liquid mixed state.

In the molding apparatus of this embodiment, as shown in FIG. 1, the outflow ports for carbon dioxide of the respective storage containers 10, each of which is communicated with the interior of the container body 1 via the siphon tube 3, are connected to the piping 7 in parallel. In this embodiment, the outflow port for carbon dioxide of each of the storage containers 10 was in the normally open state.

The storage container 10 of this embodiment is provided with the siphon tube 3 to take out only the liquid phase from the interior of the container body 1 in which carbon dioxide is in the gas-liquid mixed state. Therefore, as described above, the liquid carbon dioxide 2, in which the pressure and the solubility are stable, can be supplied to the injection molding machine 100. In this embodiment, the container body 1 is formed of aluminum as the nonmagnetic material. Therefore, the stirring bar 4, which is enclosed in the container body 1, can be driven and rotated by the magnetic stirrer 5. In this embodiment, the stirring bar 4 was always rotated at 250 rpm to agitate the liquid carbon dioxide 2 so that the temperature in the liquid carbon dioxide 2 and the solubility of the functional material are uniformized.

in this embodiment, the pressure of carbon dioxide contained in the container body 1 is arbitrary. However, in order to maintain the solubility of the functional material, it is preferable to make the use at least not less than 3 MPa and more desirably not less than 5 MPa. In view of the safety of the container body 1 and the quality control, the pressure is desirably not more than 15 MPa and more desirably not more than 7.38 MPa (critical point).

In this embodiment, in order to stabilize the solubility of the functional material with respect to carbon dioxide contained in the container body 1, it is desirable that the temperature of the container body 1 is controlled. Specifically, it is desirable to make the control to provide the temperature condition under which carbon dioxide contained in the container body 1 is in the state of not more than the critical point, i.e., in the gas-liquid mixed state. In this embodiment, as shown in FIG. 1, the three storage containers 10 were covered with an adiabatic wall 6. The air conditioning was performed so that the temperature in the adiabatic wall 6 is constant to be 21±1° C. Accordingly, the temperature in the container body 1 regularly filled with the liquid carbon dioxide 2 was stabilized to make it possible to continuously and stably supply the liquid carbon dioxide 2 having a pressure in a range of 5.5 to 6 MPa.

In this embodiment, it is desirable that the amount of dissolution (solubility) of the functional material previously dissolved in the liquid carbon dioxide 2 in the container body 1 is not more than the saturation solubility at the supply pressure of the liquid carbon dioxide during the use, in order to maintain the constant solubility with respect to the liquid carbon dioxide to be supplied to the injection molding machine 100. This feature will be explained more specifically below. For example, as shown in FIG. 5, when the liquid carbon dioxide having a pressure in a range of 5.5 to 6 MPa is supplied to the injection molding machine 100, then the solubility of the metal complex used in this embodiment with respect to the liquid carbon dioxide was about 750 mg/L under the condition of 20° C. and 6 MPa, and the solubility was about 300 mg/L under the condition of 20° C. and 5.5 MPa. That is, in order to stably supply the liquid carbon dioxide under the condition of 20° C. and 6 MPa, it is appropriate that the dissolution amount (charge amount) of the functional material previously dissolved in the liquid carbon dioxide 2 in the container body 1 is adjusted so that the solubility is not more than 750 mg/L. In order to stably supply the liquid carbon dioxide under the condition of 20° C. and 5.5 MPa, it is appropriate that the dissolution amount of the functional material previously dissolved in the liquid carbon dioxide 2 in the container body 1 is adjusted so that the solubility is not more than 300 mg/L. When the charge amount of the functional material in the container body 1 is adjusted as described above, it is possible to suppress the fluctuation of the supply amount of the functional material which would be otherwise caused by the slight change of the temperature and the pressure. Further, it is possible to suppress the excessive consumption of the functional material. Accordingly, it is possible to maintain the constant solubility with respect to the liquid carbon dioxide to be supplied to the injection molding machine 100.

In this embodiment, the operating pressure (supply pressure) of carbon dioxide to be introduced into the injection molding machine 100 was 5.5 MPa as described later on. Therefore, in this embodiment, 200 mg of the metal complex per 1 L of the liquid carbon dioxide was dissolved and used. The container, in which 7 kg of the amount can be maximally charged per one container, was used for the container body 1. The regular filling amount was 10 liters. Therefore, the metal complex of 10×0.2=2 g was charged per one container body. In this embodiment, the metal complex was previously charged into the container, and then the container was filled with the liquid carbon dioxide. Thus, the metal complex was dissolved in the liquid carbon dioxide (step S1 in FIG. 9).

Next, an explanation will be made with reference to FIGS. 1 to 3 and 9 about a method for molding the resin in this embodiment.

The liquid carbon dioxide 2, in which the metal complex was dissolved, was introduced into the injection molding machine 100 as follows. At first, the liquid carbon dioxide was allowed to outflow from the three storage containers 10 so that the indication of the pressure gauge 25 shown in FIG. 1 was within a range of 5.5 to 6 MPa. The pressure was adjusted to 5.5 MPa by means of the pressure-reducing valve 60. Subsequently, the first air operate valve 61 was opened. The liquid carbon dioxide, in which the metal complex was dissolved, was introduced into the piping 12 between the first air operate valve 61 and the second air operate valve 62 to raise the indication of the pressure gauge 24. In this embodiment, when the liquid carbon dioxide, in which the metal complex has been dissolved, is introduced into the plasticizing cylinder 40 of the injection molding machine 100, then the second air operate valve 62 is opened in the state in which the first air operate valve 61 is closed, and the liquid carbon dioxide is introduced into the melted resin in the pressure-reduced state as described later on so that the carbon dioxide and the metal complex are impregnated into the melted resin. That is, in this embodiment, the amount of introduction of carbon dioxide was controlled in accordance with the internal volume of the piping 12.

Subsequently, the screw 41 was rotated as in the conventional manner, and pellets 15 of the supplied resin were plasticized and melted. Then, the screw 41 was moved backwardly while weighing the melted resin at the portion 22 in front of the screw. The movement of the screw 41 was stopped at a predetermined weighing position. Subsequently, the screw 41 was further moved backwardly to reduce the internal pressure of the weighed melted resin. In this case, the pressure was lowered so that the resin pressure, which was measured with the internal pressure monitor 16 of the resin, was not more than 1 MPa.

Subsequently, the second air operate valve 62 was opened. The liquid carbon dioxide, with which the piping 12 was filled and in which the metal complex was dissolved, was introduced from the introducing port 8 into the flow front portion 11 of the plasticizing cylinder 40 to bring into contact with the melt resin. In this step, the liquid carbon dioxide and the metal complex were impregnated into the melted resin (step S2 in FIG. 9). The indication of the pressure gauge 24 was lowered from 6 MPa to 3 MPa when the liquid carbon dioxide was introduced. Subsequently, the second air operate valve 62 was closed. After that, the screw 41 was moved frontwardly by means of the back pressure force to return the screw 41 to the filling start position. Accordingly, the carbon dioxide and the metal complex were diffused into the melted resin at the flow front portion 11. Then, the air piston 21 was driven to open the shutoff valve 17. The melted resin was injected into the cavity 20 of the mold 26 defined by the fixed mold 18 and the movable mold 19 to fill the cavity 20 therewith (step S3 in FIG. 9).

Figure 3:
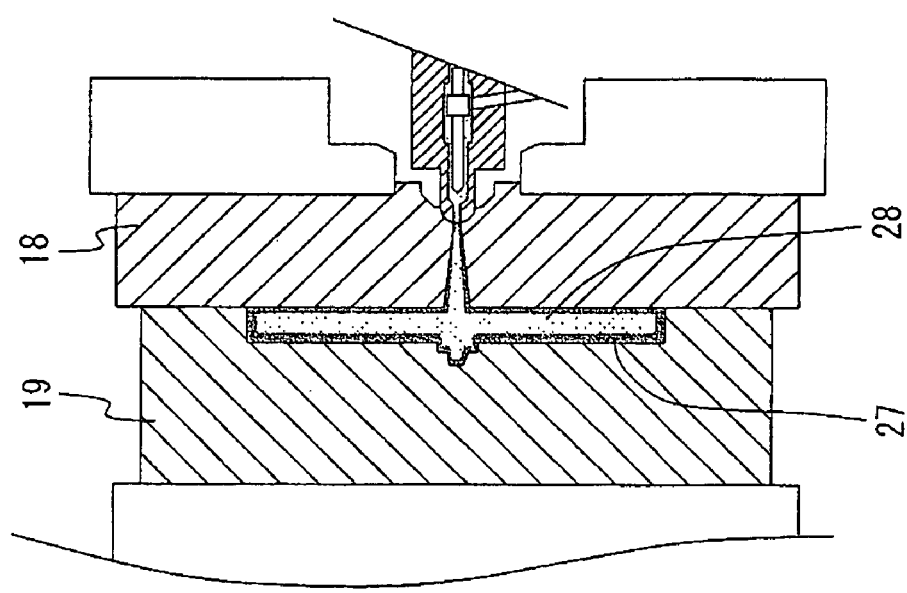
FIG. 3 shows magnified mold portions of the molding apparatus shown in FIG. 1, which illustrates a state in which the cavity is completely filled with the resin.
Figure 2:
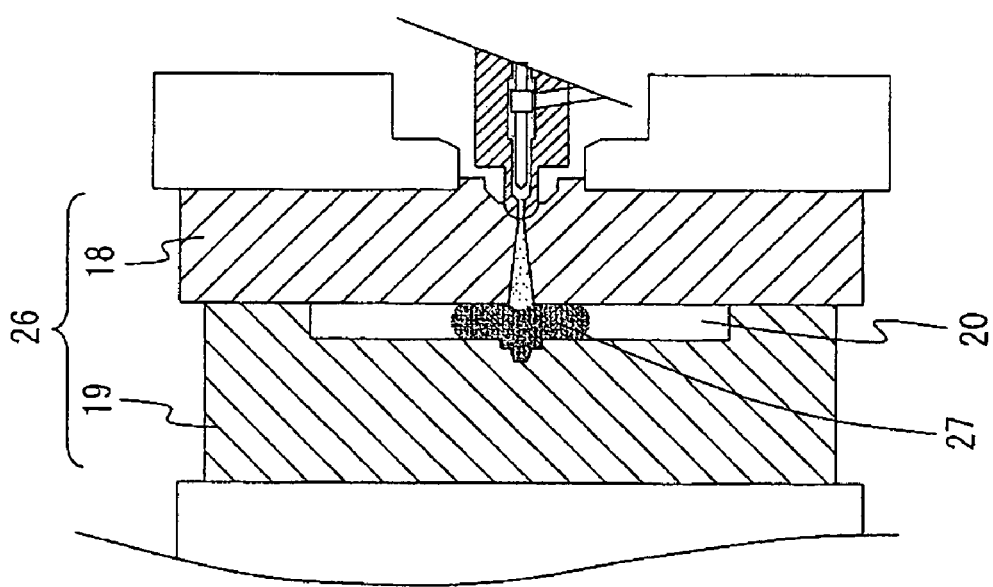
FIG. 2 shows magnified mold portions of the molding apparatus shown in FIG. 1, which illustrates the initial step of filling the cavity with the resin.

FIGS. 2 and 3 schematically show the filling situations of the melted resin in the mold 26 during the injection. FIG. 2 schematically shows the initial filling situation. In this situation, the metal complex and the carbon dioxide, which are impregnated into the flow front portion 11, are diffused in the cavity 20 while reducing the pressure. In this situation, the melted resin 27 of the flow front portion 11 is filled while bringing into contact with the mold surface due to the fountain effect during the filling to form the skin layer.

Upon the completion of the filling, as shown in FIG. 3, the layer (skin layer) 27, into which the metal complex is impregnated, is formed in the vicinity of the surface of the molded article. The layer, into which the metal complex is hardly impregnated, is formed at the core layer 28 of the molded article. Therefore, in the case of the molded article produced in this embodiment, it is possible to reduce the amount of use of the metal complex, because the metal complex, which is impregnated into the inside, does not contribute to the surface function. Further, the foaming, which would be otherwise caused by the gasification of carbon dioxide, can be suppressed by increasing the holding pressure of the melted resin after performing the primary filling as described above. In the molding method of this embodiment, carbon dioxide is impregnated into only the flow front portion 11 in the plasticizing cylinder 40. Therefore, the absolute amount of carbon dioxide is small with respect to the entire filling resin. Therefore, the surface characteristic of the molded article is hardly deteriorated, even when the counter pressure is not applied into the mold cavity 20.

In the molded article manufactured by the molding method as described above, the palladium metal complex was thermally decomposed, and the fine particles, which were reduced to the metal element of palladium, were dispersed (impregnated) in the vicinity of the surface. The surface of the molded article also included portions in which the metal complex was dispersed without being reduced.

Next, a plating film was formed on the surface of the molded article manufactured by the molding method as described above (step S4 in FIG. 9). Specifically, the plating film was formed as follows.

The molded article manufactured in this embodiment was subjected to the alkali washing and the annealing, and then the molded article was immersed in an Ni—P electroless plating solution (Nicoron DK produced by Okuno Chemical Industries Co., Ltd.) to form a nickel plating film having a thickness of 1 μm on the surface of the molded article. As a result, the nickel film (hereinafter referred to as "first plating film" as well), which had no blister, was successfully formed over the entire surface of the molded article. After that, a nickel film having a film thickness of 20 μm was formed on the first plating film by means of the electroplating method by using, as the electrode, the first plating film formed by the electroless plating method. The plating film (nickel film) was formed on the surface of the molded article manufactured in this embodiment in accordance with the method described above. The cross-hatch peel test was performed for the formed plating film. As a result, any exfoliation of the plating film was not observed. It was revealed that the satisfactory plating film was formed.

In this embodiment, the injection molding of the resin was performed by using the same apparatus as the injection molding apparatus used in the first embodiment. In this embodiment, in the same manner as in the first embodiment, the first air operate value 61 was opened, and the liquid carbon dioxide, in which the metal complex was dissolved, was introduced into the piping 12 between the first air operate value 61 and the second air operate value 62. Accordingly, the pressure at the pressure gauge 24 was raised to 5.5 MPa which was the same as the primary pressure.

Subsequently, the infrared lamp was radiated from the outside of the piping 12 immediately after introducing, into the piping 12, the liquid carbon dioxide in which the metal complex was dissolved so that the temperatures of the piping 12 and the carbon dioxide contained therein were quickly raised. In this situation, the pressure at the pressure gauge 24 was raised to 14 MPa. As a result, it was confirmed that the liquid carbon dioxide, which was introduced into the piping 12, was in the supercritical state, and the density was highly concentrated. Subsequently, in the same manner as in the first embodiment, the second air operate value 62 was opened in the state in which the first air operate value 61 was closed. The supercritical carbon dioxide and the metal complex were introduced into the plasticizing cylinder 40, and they were impregnated into the melted resin in the reduced pressure state. The injection molding was performed in accordance with the same method as that of the first embodiment except for the step described above. As a result, a molded article, in which the metallic fine particles were impregnated into the surface thereof, was stably obtained in the same manner as in the first embodiment.

In this embodiment, the pressure of the liquid carbon dioxide can be increased in accordance with the inexpensive method before the liquid carbon dioxide is introduced into the plasticizing cylinder 40. For example, it is possible to increase the amounts of introduction of the carbon dioxide and the functional material into the resin by providing the supercritical state. Accordingly, the modification efficiency is improved for the resin.

In this embodiment, a plating film was formed on the surface of the molded article in the same manner as in the first embodiment. As a result, the metal film, which had the satisfactory tight contact or adhesion, was successfully obtained in the same manner as in the first embodiment.

In the third embodiment, the injection molding of the resin was performed by using the same apparatus as the injection molding apparatus used in the first embodiment. However, in this embodiment, the air conditioning was performed so that the temperature in the adiabatic wall 6 is constant to be 40±1° C. Accordingly, the pressure in the container body 1, which was obtained when the container body 1 was fully filled, was maintained to be about 13 MPa. That is, in this embodiment, the carbon dioxide contained in the container body 1 was in the supercritical state (supercritical carbon dioxide) not in the gas-liquid intermixed state.

In this embodiment, when the supercritical carbon dioxide was introduced into the injection molding machine 100, the pressure of the supercritical carbon dioxide was reduced so that the indication of the pressure gauge 23 was 6 MPa by using the pressure-reducing valve 60. The piping passage, which ranges from the pressure-reducing valve 60 to the second air operate valve 62, was cooled and temperatureregulated by using an unillustrated temperature-regulating flow passage so that the temperature of the piping passage was 20° C.

The supercritical carbon dioxide, in which the metal complex was dissolved, was introduced into the plasticizing cylinder 40 to perform the injection molding in accordance with the same method as that of the first embodiment except for the step described above. As a result, a molded article, in which the metallic fine particles were impregnated into the surface thereof, was stably obtained in the same manner as in the first embodiment.

Further, in this embodiment, a plating film was formed by performing the electroless plating and the electroplating on the surface of the manufactured molded article in the same manner as in the first embodiment. As a result, the satisfactory plating film was successfully formed on the surface of the molded article in the same manner as in the first embodiment.

In a fourth embodiment, an explanation will be made about a method for molding the resin by using an extrusion molding machine. Those usable as the extrusion molding method in the present invention also include the blow molding, the inflation molding or the like. All of the conventional methods, which include, for example, the single screw extrusion and the twin screw extrusion, can be adopted for the mechanism of the extruder as well. The conventional manufacturing process can be also used in the post-processes to be performed after the extrusion molding step as well. It is possible to adopt the multilayer formation and the drawing or stretching step.

In this embodiment, the following single screw extrusion molding machine was used. That is, the extrusion of the resin was performed while the thickness of the melted resin was thinned and the area thereof was expanded in a fan-like form by using a die. After that, the sheet was wound by using a winding mechanism. The type of the resin usable in this embodiment is arbitrary. In this embodiment, polycarbonate was used in the same manner as in the first embodiment.

In this embodiment, the same metal complex (hexafluoroacetylacetonato palladium (II)) as the metal complex used in the first embodiment was used as the functional material. Various materials as explained in the first embodiment can be used as the functional material. The functional material can be appropriately selected depending on the way of use.

Figure 4:
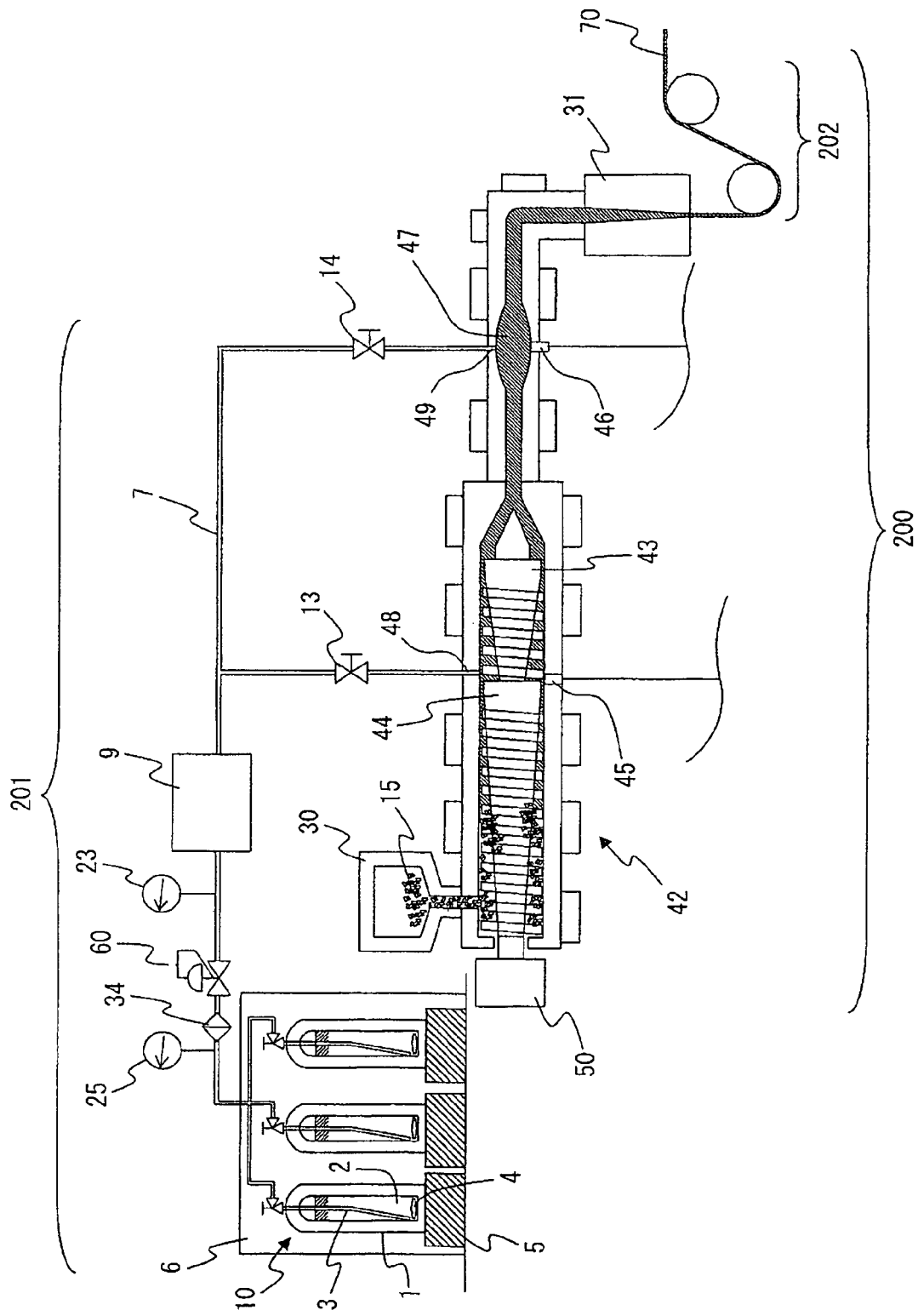
FIG. 4 shows a schematic arrangement illustrating a molding apparatus used in fourth and fifth embodiments.

FIG. 4 shows a schematic arrangement of a molding apparatus used in this embodiment. As shown in FIG. 4, the molding apparatus used in this embodiment principally includes an extrusion molding machine 200 and a carbon dioxide supply unit 201.

As shown in FIG. 4, the extrusion molding machine 200 principally includes a plasticizing melting cylinder 42, a hopper 30 which supplies pellets 15 of the resin into the plasticizing melting cylinder 42, a motor 50 which rotates a single screw 43 in the plasticizing melting cylinder 42, a die 31 which performs the extrusion while thinning the thickness of the melted resin and expanding the melted resin in a fan-like form, and a winding mechanism section 202. The extrusion molding machine 200 of this embodiment is provided with introducing ports for carbon dioxide at two positions. The first introducing port is a first introducing port 48 in FIG. 4 which is communicated with a portion disposed in the vicinity of a vent-mechanism section 44 of the single screw 43 at which the melted resin is subjected to the reduction of pressure. The second introducing port is a second introducing port 49 in FIG. 4 which is communicated with a pressure-reducing section 47 provided between the die 31 and the single screw 43. As shown in FIG. 4, the cross-sectional area is widened at the pressure-reducing section 47. Therefore, the pressure of the melted resin extruded from the single screw 43 is reduced at the pressure-reducing section 47. The resin temperature at the pressure-reducing section 47 was adjusted so that the temperature is lower than the temperatures of those other than the pressure-reducing section by using an unillustrated band heater.

As shown in FIG. 4, the carbon dioxide supply unit 201 principally includes three storage containers 10, a filter 34, a pressure-reducing valve 60, a flow rate-adjusting unit 9, two valves 13, 14, two pressure gauges 23, 25, and a piping 7 which connects the constitutive components as described above. As shown in FIG. 4, the output side (secondary side) of the valve 13 is connected to the first introducing port 48 of the extrusion molding machine 200 via the piping 7, which is communicated with the vent-mechanism section 44 in the plasticizing melting cylinder 42. On the other hand, the output side of the valve 14 is connected to the second introducing port 49 of the extrusion molding machine 200 via the piping 7, which is communicated with the pressure-reducing section 47 in the plasticizing melding cylinder 42. The storage container 10, which stores the carbon dioxide dissolved with the functional material used in this embodiment, is constructed in the same manner as in the first embodiment.

Next, an explanation will be made with reference to FIG. 4 about a method for molding the resin in this embodiment.

The liquid carbon dioxide, in which the metal complex was dissolved, was introduced into the extrusion molding machine 200 as follows. At first, the carbon dioxide was allowed to outflow from the storage container 10 so that the indication of the pressure gauge 25 shown in FIG. 4 was within a range of 5.5 to 6 MPa. The pressure was adjusted to 5.5 MPa by using the pressure-reducing valve 60. Subsequently, the liquid carbon dioxide was allowed to flow while providing a constant flow rate of the liquid carbon dioxide by using the flow rate-adjusting unit 9. The piping 7 between the storage container and the valves 13, 14 was filled with the liquid carbon dioxide in which the metal complex was dissolved.

Subsequently, the liquid carbon dioxide, in which the metal complex was dissolved, was introduced into the plasticizing cylinder 42 as follows. In this embodiment, the liquid carbon dioxide, in which the metal complex was dissolved, was introduced via the first introducing port 48 communicated with the vent-mechanism section 44 in the plasticizing cylinder 42. At first, the pellets 15 of the resin were introduced from the hopper 30 into the heated plasticizing cylinder 42, and the pellets 15 were melted by the rotation of the single screw 43 and the motor 50 in the heated plasticizing cylinder 42. Subsequently, the valve 13 was opened to continuously introduce the liquid carbon dioxide dissolved with the metal complex into the melted resin while confirming the fact that the internal pressure of the melted resin was reduced to be lower than the pressure of 5.5 MPa of the liquid carbon dioxide by using an internal pressure monitor 45 for the melted resin provided at the lower portion of the vent-mechanism section 44 at which the melted resin is subjected to the pressure reduction. Accordingly, the carbon dioxide and the metal complex were impregnated into the melted resin. The melted resin, in which the carbon dioxide and the metal complex were impregnated, is agitated again by the screw 43 at the downstream from the vent-mechanism section 44. Accordingly, the metal complex can be diffused uniformly to the entire resin. In this embodiment, the amount of permeation into the melted resin was adjusted by throttling the feed amounts of the liquid carbon dioxide and the metal complex from the carbon dioxide supply unit 201 (specifically by controlling the flow rate by using the flow rate-adjusting unit).

In a fifth embodiment, the liquid carbon dioxide, in which the metal complex was dissolved, was introduced via the second introducing port 49 of the extrusion molding machine 200 used in the fourth embodiment. Except for the above, the molding process is the same as that in the fourth embodiment. The metal complex used in this embodiment was also the same as that used in the fourth embodiment.

As shown in FIG. 4, the second introducing port 49 of the extrusion molding machine 200 is communicated with the pressure-reducing section 47. The cross section of the flow passage for the melted resin is increased at the pressure-reducing section 47. Therefore, the melted resin, which is extruded from the plasticizing cylinder 42, is subjected to the pressure reduction at the pressure-reducing section 47. The temperature is controlled at the pressure-reducing section 47 by using the band heater so that the temperature of the melted resin is lowered. In this embodiment, the valve 14 was opened to continuously introduce the liquid carbon dioxide dissolved with the metal complex into the melted resin while confirming the fact that the internal pressure of the melted resin was lower than the pressure of 5.5 MPa of the liquid carbon dioxide by using the internal pressure monitor 45 for the resin provided at the pressure-reducing section 47.

However, in this embodiment, the agitation is not performed with the screw for the resin and the carbon dioxide. The carbon dioxide and the metal complex, which are introduced in one direction, are diffused in the lateral direction as the stretching or drawing direction of the resin at the die in the plasticizing cylinder. Therefore, an extrusion sheet 70, in which the metal complex has been impregnated into the surface on one side, is molded. In this embodiment, the sheet-shaped polycarbonate molded article 70, in which the metal complex was decomposed and the palladium metal element was dispersed in the vicinity of the surface on one side, was obtained in accordance with the method as described above. The metal complex was dispersed in the vicinity of the surface without being reduced at a part of the surface of the molded article 70.

Subsequently, the molded article manufactured in this embodiment was subjected to the alkali washing and the annealing, and then the molded article was immersed in an Ni—P electroless plating solution (Nicoron DK produced by Okuno Chemical Industries Co., Ltd.) to form a nickel plating film having a thickness of 1 μm. As a result, the nickel film (hereinafter referred to as "first plating film" as well), which had no blister, was successfully formed over the entire surface of the molded article. After that, a nickel film having a film thickness of 20 μm was formed on the first plating film by means of the electroplating method by using, as the electrode, the first plating film formed by the electroless plating method. The plating film (nickel film) was formed on the surface of the molded article manufactured in this embodiment in accordance with the method described above. The cross-hatch peel test was performed for the formed plating film. As a result, any exfoliation of the plating film was not observed. It was revealed that the satisfactory plating film was formed.

According to the storage container of the present invention, the carbon dioxide, in which the functional material has been dissolved, can be supplied by using the inexpensive apparatus without using any special high pressure apparatus. Therefore, the storage container of the present invention is preferably usable as the supply source for the carbon dioxide and the functional material capable of being used when the fiber or the molded article is modified and processed by using the carbon dioxide in which the functional material has been dissolved.

In the molding method of the present invention, the functional material can be impregnated into the resin by using the liquid carbon dioxide having the low temperature and the low pressure. Therefore, the molded article, in which the surface or the interior has been modified with the functional material, can be produced easily and inexpensively without using any special high pressure apparatus for allowing the carbon dioxide to be in the high pressure state or the supercritical state. In the molding method of the present invention, it is possible to simultaneously perform the molding process and the surface-modifying method for the resin by using the liquid carbon dioxide as the solvent. Therefore, the molding method of the present invention is preferred as the method for producing the molded article modified with the functional material.

In the method for forming the plating film of the present invention, it is possible to simultaneously perform the molding process and the pretreatment process for the clean electroless plating. Therefore, the method is more preferred as the method for forming the plating film. In the method for forming the plating film of the present invention, the satisfactory plating film can be formed even on the polymer base material (resin material) for which the surface has been hardly roughened by the etching in the case of the conventional plating method and it has been difficult to form any electroless plating film having the highly tight contact or adhesion. Therefore, the method for forming the plating film of the present invention is the method for forming the plating film which is applicable to all of the fields.

What is claimed is:

1. A storage container for containing a carbon dioxide, which is used for a method for molding a molded article by introducing a liquid carbon dioxide, in which a metal complex or a metal alkoxide is dissolved, to a melted resin in a plasticizing cylinder of an injection molding machine or the resin which is in a melted state or a softened state in a extrusion molding machine to impregnate the carbon dioxide into a resin, the storage container comprising:

the carbon dioxide in a gas-liquid mixed state;

the metal complex or the metal alkoxide, being dissolved in the carbon dioxide in the gas-liquid mixed state, which modifies a surface or a interior of the molded article;

a container body which hermetically contains the carbon dioxide in the gas-liquid mixed state in which the metal complex or the metal alkoxide is dissolved not more than a saturation solubility;

a siphon tube through which only liquid phase, in which the metal complex or the metal alkoxide is dissolved, is taken out from the carbon dioxide in the gas-liquid mixed state in the container body.

2. The storage container according to claim 1, wherein the storage container is a transportable storage container.

3. The storage container according to claim 1, wherein the carbon dioxide includes the liquid carbon dioxide having a pressure in a range of 3 MPa to 7.38 MPa.

4. The storage container according to claim 1, further comprising a stirring apparatus.

5. The storage container according to claim 4, wherein the stirring apparatus includes a stirring bar which is provided in the container body, and a magnetic stirrer which drives the stirring bar.

6. The storage container according to claim 5, wherein the container body is formed of a nonmagnetic material.

7. The storage container according to claim 6, wherein the nonmagnetic material is formed of one material selected from the group consisting of aluminum, stainless steel, inconel, hastelloy, and titanium.

8. A method for molding a resin using an injection molding machine or an extrusion molding machine, comprising:
taking out, through the siphon tube, only the liquid carbon dioxide, which is the liquid phase in which the metal complex or the metal alkoxide is dissolved not more than the saturation solubility, from the carbon dioxide in the gas-liquid mixed state in the container body of the storage container as defined in claim 1;
impregnating the metal complex or the metal alkoxide into the resin by bringing the liquid carbon dioxide taken out from the storage container, in which the metal complex or the metal alkoxide is dissolved, into contact with the melted resin in the plasticizing cylinder of the injection molding machine or the resin which is in the melted state or the softened state in the extrusion molding machine, the resin having a temperature higher than that of the liquid carbon dioxide.

9. The method for molding the resin according to claim 8, wherein a state of the resin is controlled so that the liquid carbon dioxide is changed into one of carbon dioxide in a supercritical state and high pressure carbon dioxide gas when the liquid carbon dioxide is brought into contact with the resin.

10. The method for molding the resin according to claim 8, which is a method for molding a thermoplastic resin using the injection molding machine provided with the plasticizing cylinder for injecting the melted resin into a mold, the method for molding the thermoplastic resin comprising:
introducing the liquid carbon dioxide containing the metal complex or the metal alkoxide into a flow front portion of the plasticizing cylinder to bring the liquid carbon dioxide into contact with the melted resin in the plasticizing cylinder so that the metal complex or the metal alkoxide is impregnated into the melted resin; and
injecting the melted resin in the plasticizing cylinder into the mold to fill the mold therewith.

11. The method for molding the resin according to claim 8, which is a method for molding a thermoplastic resin using the extrusion molding machine, the method for molding the thermoplastic resin comprising:
bringing the liquid carbon dioxide containing the metal complex or the metal alkoxide into contact with the thermoplastic resin which is in the melted state or the softened state in the extrusion molding machine to impregnate the metal complex or the metal alkoxide into the thermoplastic resin; and
performing extrusion molding for the thermoplastic resin into which the metal complex or the metal alkoxide has been impregnated.

12. A method for forming a plating film, comprising:
molding the molded article including the metal complex or the metal alkoxide impregnated into the surface of the molded article by using the method for molding the resin as defined in claim 8; and
forming the plating film by an electroless plating method on the surface of the molded article into which metal complex or the metal alkoxide has been impregnated.

* * * * *